United States Patent

[11] 3,633,858

[72] Inventors Herbert James Houston
Oakville, Ontario;
Robert Gordon Baird; Kenneth Dale Bolt, both of Burlington, Ontario; Adolf Gretzinger, Ancaster, Ontario, all of Canada
[21] Appl. No. 829,263
[22] Filed June 2, 1969
[45] Patented Jan. 11, 1972
[73] Assignee N. Slater Company, Division of Slater Steel Industries Limited

[54] CLAMPING ASSEMBLY FOR AERIALLY SUSPENDED CABLES
4 Claims, 2 Drawing Figs.
[52] U.S. Cl. ................................... 248/63, 248/74 R
[51] Int. Cl. .................................... F16l 3/12
[50] Field of Search ............................ 248/63, 54, 313.3, 315.5, 62, 226.3, 66, 74, 361 B; 174/40; 24/243.7, 249 F, 249 P; 339/266, 266 L

[56] References Cited
UNITED STATES PATENTS

| 2,096,580 | 10/1937 | Frank | 248/316 X |
| 2,826,206 | 3/1958 | Slater | 248/316 X |
| 3,012,091 | 12/1961 | Schiffmann | 174/94.1 |
| 3,288,409 | 11/1966 | Bethea | 248/62 |
| 1,469,595 | 10/1923 | Hick | 248/361 X |
| 2,055,071 | 9/1962 | Dzus | 248/74 X |

FOREIGN PATENTS

| 1,092,980 | 11/1960 | Germany | 174/94.1 |

Primary Examiner—Chancellor E. Harris
Attorney—Stevens, Davis, Miller & Mosher

ABSTRACT: A cable clamping assembly which has a main clamp member which cooperates with a spring clamp member to firmly hold a cable therebetween. Holding means extend through the clamp members to hold the cable so as to substantially eliminate relative movement. The spring clamp member possesses sufficient resiliency and strength to accommodate rearrangement of physical characteristics within the assembly during repeated temperature cycling so as to substantially maintain an original set of installation conditions.

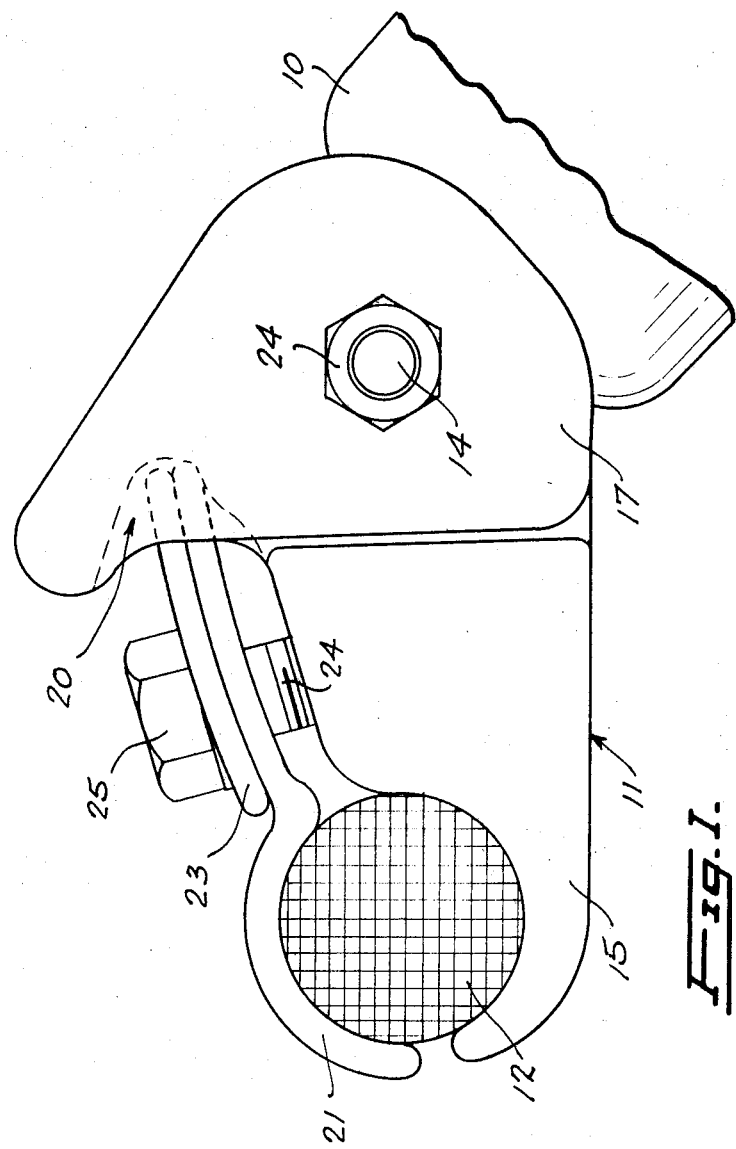

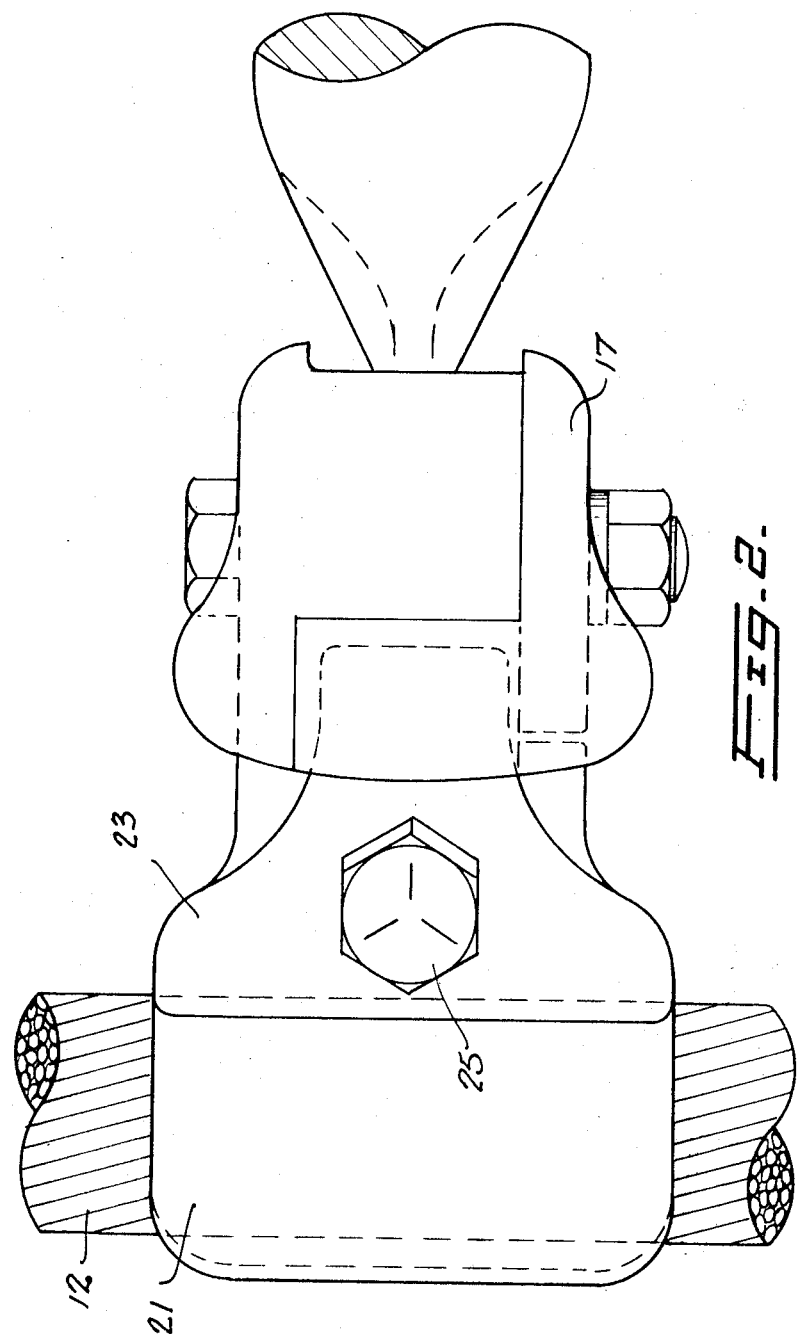

CLAMPING ASSEMBLY FOR AERIALLY SUSPENDED CABLES

The present invention relates to clamps for holding aerially suspended cables generally. The invention may find particular use for holding or clamping overhead electrical transmission lines where they may be required for holding the cables to pylons or other supporting structures.

In modern high-voltage systems, each pole or phase of the system may be constituted by a "bundle" of cables, which are termed subconductors. These subconductors are maintained at a fairly constant spacing along the spans between adjacent pylons or supporting structures by spacers positioned at intervals. Spacers are known which also serve to damp out vibrations occurring in the cables due, for example, to wind effects, and damping may also be effected by separate dampers. The present invention includes within its scope clamps used to attach such spacers, spacer dampers, or dampers, to the cables.

The cables of an electrical transmission line are subjected to various forces in addition to the normal loads imposed by gravity. In single cable systems, such forces include wind forces and vibrations caused by wind effects, and forces due to expansion and contraction of the cables caused by temperature changes, which occur both with changes in atmospheric temperature and in the current carried by the cable. Forces on the cables also arise due to the interplay of the electrical fields and magnetic fields around the cables. In addition, dampers attached to the cables to minimize vibration frequently apply torque to the cables.

Numerous cases have been experienced of failure of cables at the clamping points, or loosening or failure of the clamp itself. Such failures arise because if a cable clamp slackens off sufficiently to allow even a very slight movement of the cable under the many forces to which it is subjected, the surface of the cable held by the clamp quickly becomes worn and abraded, causing further loosening and further abrasion, until the cable eventually fails. Also, the movement of the cable in the clamp can cause loosening of the clamping bolts or other holding means, in which case the clamp bolts may eventually become completely unscrewed and release the cable.

A basic reason for such failures has been that the clamps used have been too rigid and failed to allow for the necessary expansion of the cables caused by increases in cable temperature. The known clamps have generally comprised two rigid clamp members, and holding means such as a steel bolt for tightly clamping the members to the opposite side of a cable. Although the clamp members may be made of the same material as that of the cables, for example of aluminum, and therefore may have very similar coefficients of expansion, the steel bolt has a lower coefficient of expansion so that the heating of the cable and of the clamp results in a compressive stress being imposed on the cable. Additionally, the temperature of the cable may increase due to high electrical currents, with the clamp members remaining relatively cold, and this would also subject the cable to compressive stress. Electrical transmission cables are generally formed of relatively soft metals such as copper or aluminum, usually the latter, and when such materials are subjected to compressive stress in the manner described cold flow of the material occurs to relieve the stress. Cold flow results in a permanent deformation of the cable, so that the clamping force at any given temperature is subsequently reduced. Successive temperature cycles of this kind with successive periods of cold flow in the cable would lead to eventual loosening of the cable within the clamp, with the resultant failure described.

In order to allow for expansion of the cable upon warming or heating, energy storing devices have been used in the clamps to allow the clamp members to open slightly with the expansion of the cable. Such energy storing devices have commonly taken the form of washers, for example of conical form, or lock washers of various kinds giving some resiliency. Additionally, cable clamps have been proposed having flat spring members. However, the known devices suffer from various drawbacks. For example, they are generally designed to operate at a high stress, which may lead to fatigue in the spring material particularly if there is any corrosion. Furthermore, the resiliency of such spring members has been very limited in view of the need for the spring members to exert adequate clamping force on the cable, and yet to be accommodated in a small space.

Broadly speaking, the need for a clamping member with sufficient elasticity to accommodate rearrangement of physical characteristics within the assembly so as to substantially maintain an original set of installation conditions is clearly apparent.

A main object of the present invention is to fill this need and provides a cable clamp which is capable of holding a cable firmly over a much longer period than known clamps, even when subjected to repeated temperature cycling.

According to the present invention a clamp assembly for an aerially suspended cable comprises two clamp members adapted to hold a cable therebetween, said assembly including at least one spring clamp member within its construction which is shaped and dimensioned to firmly hold said cable so as to substantially eliminate relative movement therebetween, said spring clamp member possessing sufficient resiliency and strength to permit normal physical change within the assembly during repeated temperature cycling.

The clamp of the present invention also provides for an electrical cable comprising two clamp members adapted to receive said cable therebetween. One of said clamp members in such arrangement is constituted by the main leaf of a multileaf spring, and the clamp includes holding means engageable with the outer leaf of said multileaf spring and with the other clamp member to hold said clamp members firmly clamped onto the cable.

A multileaf spring has been found to be advantageous for use in cable clamps, since such a spring can readily be designed having the required characteristics of high strength and reasonable flexibility, while being very compact. A single leaf spring is also effective and advantageous in use but when a single leaf spring is used, the cross-sectional area of the spring should be carefully chosen in relation to strength requirements. In order for a selected single spring to have sufficient flexibility the spring may have to be longer than the longest spring used in a multileaf spring assembly. Care should also be taken in the use of a long spring that it does not conflict with other design requirements of the clamps, such as for example in its application to a spacer damper where the clamp arm is required to be relatively short. Design problems which may be presented with the use of a single spring could be overcome by selecting for use the alternative embodiment disclosed herein of the multileaf spring. The flexibility of such a multileaf spring of a given cross section should also prove greater than that of a single leaf spring. Accordingly, a multileaf spring of the desired strength and flexibility can readily be provided within a limited length. The use of a multileaf spring also proves acceptably economical in material, since the outer spring leaves can be restricted to the central part of the spring where the stress is highest. Despite these factors however, the use of a single leaf spring will satisfy the objects of this invention and is also acceptable and economical for many installations.

With the use of a multileaf spring construction and where the clamp is intended to hold a single cable, the holding means will preferably engage the outer leaf of the multileaf spring near to the center thereof, and the outer end of the leaf spring remote from the cable will be supported by an extension of the other clamp member, which is preferably a rigid member.

The holding means preferably comprises a bolt extending through the leaf spring and through the other clamp member, means on said bolt being engageable with the outsides of the spring and of the said other clamp member.

Clamp members, in accordance with known practice, preferably have cable receiving grooves which are of roughly semicylindrical form, although subtending less than 180° at their center of curvature. The groove in the main leaf of a multileaf spring is provided for by a curved end portion thereof, and preferably the outer leaf or leaves of the spring terminate short of said curved end portion.

A preferred embodiment of the present invention will now be described with reference to the accompanying drawings, in which:

FIG. 1 shows a side elevation of the multileaf spring embodiment of a clamp according to the invention forming one end clamp of a spacer damper, FIG. 2 is a top view of the clamp of FIG. 1.

The construction of a single leaf spring embodiment will be essentially the same as that shown in FIGS. 1 and 2 except of course, that only one leaf spring will be provided the length of which varies in accordance with design and strength requirements.

The spacer damper, one end only of which is shown in FIGS. 1 and 2, is a device for maintaining the spacing between two cables of a bundle of cables of the same potential extending between pylons. Several such spacer dampers would, in practice, be used along each span between adjacent pylons. Such a spacer damper, which also serves to damp vibrations in the cables, is described more fully in our separate patent application filed thereon. The spacer damper includes a main body 10, at each end of which is pivotally attached a clamp arm 11 for holding a cable 12. Only one of the clamps is shown herein. The pivotal connection between each clamp arm 11 and the body 10 includes a pivot pin in the form of a bolt 14, and resilient energy absorbing washers which restrict the motion of the arm relative to the body. Incipient vibrations in the cables due to wind effects cause the arms 11 to move slightly about their pivots and the energy of this motion is absorbed by the washers so that the vibrations of the cable are damped. Clearly, the pivotal movement of the arms imposes a torque on the cables, so that the clamps must hold the cables very securely to prevent them from twisting relative to the clamps, since this would cause wear of the cables and eventual failure. Accordingly, the clamps of such a cable damper are subjected to more severe conditions than are ordinary suspension clamps, and must be particularly well designed.

Each clamp arm comprises essentially a rigid clamp member 15, a resilient clamp member 21 constituted by the main leaf of a multileaf spring, and holding means in the form of a bolt 24 having a head 25 engaging with an outer leaf 23 of the spring. In this embodiment, the main leaf is longer than the outer leaf, but the leaves could conceivably be of the same length, in which case the main leaf would be the innermost leaf.

The rigid clamp member 15, which is a casting for example of aluminum alloy, and which constitutes the main part of the arm 11, has at its outer end a groove of roughly semicylindrical form, although subtending less than 180 at its center of curvature so as readily to receive the cable 12 having the same radius of curvature. The casting 15 has at its inner end a side extension forming one side of a recess which is closed at its other side by a removable side plate 17, and this recess receives a tongue projecting from the end of body 10. A resilient washer is disposed at each side of the tongue within the recess, and bolt 14 passes through the extended side part of the casting 15, through the tongue, and through the side plate 17, being provided with a nut to hold the elements together with the bolt forming a pivot pin. The precise details of this pivotal arrangement between the arm 11 and the body 10, including the resilient energy absorbing washers, are fully described in our copending patent application.

Near the inner end of the arm 11, and on the same side as the cable receiving groove, an extension of the casting 15 provides a recess 20 facing the outer end of the arm, which recess receives the end of the resilient clamp member 21. This recess is closed on the near side shown in FIG. 1 by the side plate 17. Also, the casting 15 is provided with a threaded bore situated approximately midway between the recess 20 and the center of the cable groove for reception of the bolt 24 which has a compressible insert in its thread so as to be securely held in place when assembled.

The clamp member 21, which acts as a keeper plate for the cable, is formed from a flat strip of spring steel, having the outline form indicated in FIG. 2, and bent as shown in FIG. 1. Clamp members of other material possessing the desired spring and resiliency may alternatively be used. As shown, the clamp member includes a sharply curved end portion which is shaped to complement the groove of the casting 15, being substantially semicircular in cross section. The main inner portion of the clamp member 21 also has a slight curvature, with the convex side outwards, and the inner end of the clamp member is supported by the inner surface of recess 20 provided in the extension of the casting 15. The clamp member 21 constitutes the inner and main leaf of a two-leaf spring, the outer leaf of the spring being a further curved spring steel member 23 in the form of a washer plate. This outer leaf has a slight curvature matching that of the main portion of the member 21. The two leaves of the spring both have substantially the same thickness, and both have a hole overlying the bore in the casting 15 to accommodate the shank of a bolt 24, the head 25 of which engages the outer surface of the leaf 23.

In use, bolt 24 is slackened off sufficiently to allow cable 12 to be inserted between the two clamp members, and the bolt is then tightened sufficiently to cause deflection of both leaves of the spring clamp. In practice the tightening is sufficient to cause, over a fairly short period of time, a slight compression set in the cable, but once this condition of equilibrium has been reached very little further permanent set is produced with repeated temperature cycling.

As an example, in one clamp designed for use on a 1.6-inch diameter multistrand aluminum cable, a leaf spring having two leaves as shown was used having the following characteristics:

Length of spring between the center of conductor and end of the spring supported by the casting: 3.4 inches.

Width of spring in region of bolt (point of maximum stress): 3¼ inches.

Thickness of inner and outer spring leaves: both three-sixteenth inch.

Material: spring steel.

The relation between dimensions, material and spring constant are well known and on the basis of these known factors a determination of what spring should be selected for a given use.

The form and shape of the spring exampled above are as shown in FIGS. 1 and 2, and the load deflection characteristics of the spring are shown in FIG. 3, which is a graph of bolt tension (in pounds) against the spring deflection at the bolt. It will be seen that with rising bolt tension the relation between the bolt tension and the spring deflection is almost linear, as is to be expected in a spring assembly, but with decreasing load the deflection lags somewhat due to the friction between the leaves of the spring.

The effect of temperature cycling on the cable clamping pressure have been tested and demonstrated to show the variations of bolt tension (proportional to clamping pressure) with cable temperatures over one complete temperature cycle. Tests were conducted in temperatures ranging from minus 60° F. to a maximum operating temperature of 240° F. which showed that the elasticity in the assembly enabled the clamp to return to its original position. The stress to which the cable is subjected during the cycle produces a slight permanent set which may be evidenced by the reduction in bolt tension as between the conditions at the beginning and at the end of the cycle, but it is clear that the resiliency of the spring clamp member results in less reduction of the clamping force than occurs where a rigid member is used.

If it is required to provide a spring clamp member having similar clamping strength but greater resiliency, without undue increase in length, a spring with 3 or more leaves may be provided, with the main leaf still constituting the clamping member, and with the outer leaves terminating short of the curved end portion of the clamping member.

The embodiments of the invention in which an exclusive property or privilege is claimed are defined as follows:

1. A cable clamping assembly suitable for use with a spacer damper for dampening vibrations in aerially suspended cables in which the spacer damper has a main body, said assembly comprising:
    a. two clamp members adapted for connection to said spacer damper body and shaped and dimensioned to hold a cable therebetween,
    b. one of said clamp members being a casting forming a main cable supporting member,
    c. a spring clamp member having a generally flat leaf springlike section and a cable holding jaw section which is shaped and dimensioned to firmly hold said cable so as to substantially eliminate relative movement therebetween,
    d. said leaf springlike section being dimensioned to extend into a recess formed in said casting,
    e. holding means adapted to engage the said spring clamp member approximate the center of said spring the end of said spring remote from said cable being in clamping connection with the structure of said main cable supporting member,
    f. said holding means comprising a bolt extending through both said spring clamp member and said main cable supporting member,
    g. said spring clamp member possessing sufficient resiliency and strength to accommodate rearrangement of physical characteristics within the assembly during repeated temperature cycling so as to substantially maintain an original set of installation conditions.
2. A spacer damper for damping vibrations in aerially suspended cables including:
    a. a main spacer damper body section,
    b. two clamp members adapted for connection to said spacer damper body and shaped and dimensioned to hold a cable therebetween,
    c. one of said clamp members being a casting forming a main cable supporting member,
    d. a spring clamp member having a generally flat leaf springlike section and a cable holding jaw section which is shaped and dimensioned to firmly hold said cable so as to substantially eliminate relative movement therebetween,
    e. said leaf springlike section being dimensioned to extend into a recess formed in said casting,
    f. holding means adapted to engage the said spring clamp member approximate the center of said spring the end of said spring remote from said cable being in clamping connection with the structure of said main cable supporting member,
    g. said holding means comprising a bolt extending through both said spring clamp member and said main cable supporting member,
    h. said spring clamp member possessing sufficient resiliency and strength to accommodate rearrangement of physical characteristics within the assembly during repeated temperature cycling so as to substantially maintain an original set of installation conditions.
3. A cable clamping assembly as claimed in claim 1 wherein one of said clamp members is constituted by the main leaf of a multileaf spring, said clamp including holding means engageable with the outer leaf of said multileaf spring and with the other clamp member so as to hold said clamp members firmly clamped onto the cable.
4. A cable clamping assembly according to claim 3 wherein the main leaf of said multileaf spring includes a curved end portion for engaging the cable, and wherein the outer leaf or leaves of said spring terminate short of said curved end portion.

\* \* \* \* \*